March 18, 1924.  
C. L. CRUVER  
WINDSHIELD ATTACHMENT  
Filed Nov. 23, 1922  
1,487,510
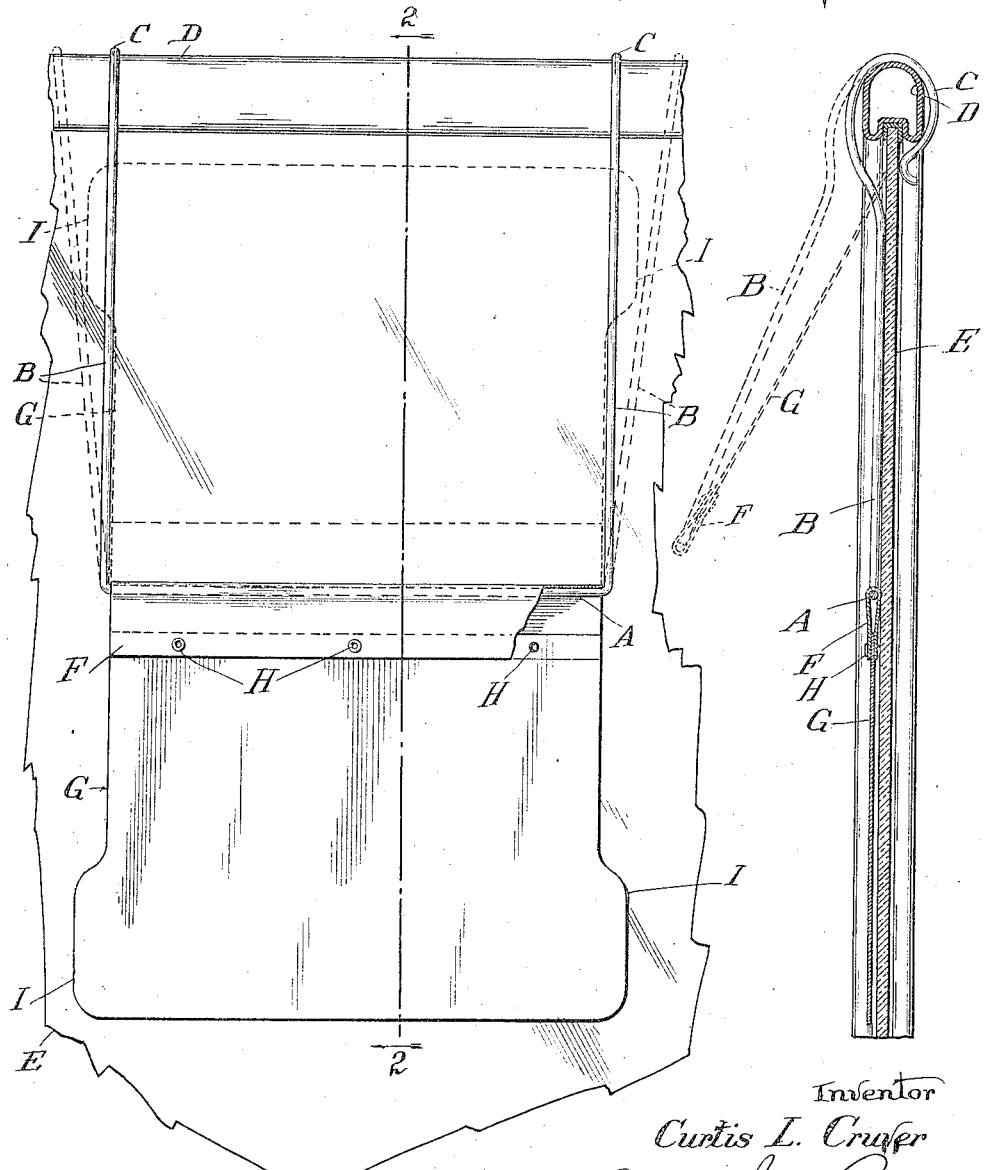

Patented Mar. 18, 1924.

1,487,510

UNITED STATES PATENT OFFICE.

CURTIS L. CRUVER, OF CHICAGO, ILLINOIS.

WINDSHIELD ATTACHMENT.

Application filed November 23, 1922. Serial No. 602,816.

*To all whom it may concern:*

Be it known that I, CURTIS L. CRUVER, a citizen of the United States, and a resident of Chicago, in the county of Cook and State of Illinois, have invented certain new and useful Improvements in Windshield Attachments, of which the following is a specification.

The invention has for its object to provide means for suspending back of the wind-shield of an automobile and in contact preferably with the rear face of said wind-shield, a transparent or translucent device so positioned relatively to the driver as to relieve the eyes of the latter from the glare of the sun rays or the head-lights of approaching vehicles whereby the driver may more comfortably and easily see the road and objects thereon or depressions therein, in driving.

The particular object of the present invention is to provide a device of the kind and for the purpose specified which may, when not in use, be positioned out of the normal line of vision of the driver without requiring the same to be moved laterally of its normal position or detached from its supports.

A suitable and preferred embodiment of the invention is illustrated in the accompanying drawings wherein:

Figure 1 is a fragmentary rear elevation of an ordinary wind-shield of an automobile, or the like, equipped with a device constructed in accordance with the invention.

Figure 2 is a vertical transverse section of the same on line 2—2 of Figure 1.

Figure 3 is a fragmentary detail perspective view illustrating another form of suspension device.

My said device comprises preferably a U-shaped wire frame consisting of a straight middle portion A, parallel arms B, which are preferably very flexible, and suitable suspending means such as the hooks C disposed at the free ends of said arms B. The hooks C, which are exemplary of suitable means for attaching the ends of the arms to a support and which may be changed and varied according to the nature of the support, are in the next illustration shown as engaged with the upper frame member D of an ordinary wind-shield E.

Pivotally secured to the middle portion A of the frame is a sheet metal member F consisting of a folded strip of metal between the free ends of which a sheet G of preferably a colored transparent celluloid is secured by means of the rivets H or similar fastening elements of a suitable nature. The space between the flanges of said strip F is sufficient to easily receive the middle portion A of the suspended frame so that said strip F may be easily swung on said part A as a pivot.

The said sheet G and the portion A are preferably of such a width as to permit said strip F to be turned through an arc of 180 degrees from the position shown in Figure 1 so that its ends lie between the arms B of the frame and the main portion of the side edges of the plate G may become similarly disposed. Adjacent its free end, however, the side edge portions of the plate G are extended outwardly to provide the projections I so that between the side edges of said projections the said plate G is of greater width than the space separating the arms B from each other. The purpose of this is to permit said plate G to be turned so that the said projections I are engaged between the arms B and the opposed inner face of the wind-shield E and thus supported in raised position out of the normal line of vision of the driver of the car. The plate G is preferably very flexible so that it may be readily bent or sprung to cause the said projections I to be passed between each of the arms B and the wind-shield as indicated in dotted lines in Figure 1. The arms B being flexible may, if desired, be sprung outwardly from the normal positions as indicated in dotted lines in Figure 1, so as to permit the said free end portion of said plate G, including said projections, to pass between said arms into contact with the wind-shield, whereupon said wires may be released and permitted to spring back to their normal positions shown in full lines in Figure 1.

Preferably the hooks C or other means for securing the arms B to a suitable support, are so constructed as to permit the frame to be moved pivotally relatively to the support through an arc of substantially 90 degrees, whereupon the plate G may be turned through a similar arc in the opposite direction and thus caused to bring the projections I between the arms B and the wind-shield as indicated in dotted lines in Figure 2.

The advantage of having the plate G pivotally secured to the suspending frame is not only so as to adapt the device for operation as hereinbefore described, but also to permit the device to be packed in the minimum sized package for mailing and shipping purposes, it being obvious that the saving of space decreases the cost of the package as well as weight and shipping cost and also saves store space and the like.

In some instances, such, for example, as in cars having closed bodies such as sedans, limousines and the like, the upper member of the wind-shield frame is not adapted to receive the hook C and in such cases it may be necessary to provide nails or screws or similar headed projections mounted immediately above the upper edge of the wind-shield. In such cases the upper ends of the arms B will be provided with suitable eyelets or loops J to receive the shanks of said headed fastening devices, and said arms coiled below said loops to form springs K which are sufficiently flexible to permit the middle portion B of the frame to be raised or swung through an arc of approximately 90 degrees, if desired, to permit the plate G to be turned as suggested in dotted lines in Figure 2. The springs K will be further desirable as affording a means for resiliently forcing the middle portion B and the metal strip pivotally mounted thereon, into close contact with the wind-shield to prevent rattling.

Obviously the specific construction illustrated and described herein is capable of modification and variation to produce the same or substantially the same results and advantages and it will be further understood that such changes and variations will constitute no departure from the invention as defined in the appended claims.

I claim as my invention:

1. A device of the kind specified including a plate or sheet of suitable material, a folded strip of metal secured to and embracing one edge portion thereof, a supporting member for said plate or sheet comprising a U-shaped wire frame having its middle portion passed through and pivotally engaged with said metal strip, the arms of said supporting member terminating in flexibe hooks adapted to receive the upper frame-portion of the windshield, the free end portions of said hooks opposing portions of said arms bent to prevent their contact with the inner face of the windshield pane and said free ends adapted to bear upon the outer face of said windshield pane and exert a yielding pressure thereon to thereby cause the portion of said supporting member below said hooks to bear yieldably upon the inner face of the windshield to prevent rattle.

2. A device of the kind specified, comprising a substantially U-shaped supporting element having flexible arms, the latter terminating in means for effecting attachment thereof to a part of a vehicle contiguous to the upper edge of the wind-shield frame, a plate of transparent or translucent material pivotally secured to the middle portion of said element and adapted to normally depend therefrom, the open space between the arms of said element being in part of less width than said plate, the latter adapted to be swung through an arc of substantially one hundred eighty degrees to cause a portion thereof to become disposed between the said arms of said element and a wind-shield pane, said arms adapted to coact with the said pane to retain said plate in the last-named position.

3. A device of the kind specified comprising a substantially U-shaped supporting element having flexible arms, the latter terminating in means for effecting attachment thereof to a part of a vehicle contiguous to the upper edge of the wind-shield frame, a plate of transparent or translucent material pivotally secured to the middle portion of said element and adapted to normally depend therefrom, the open space between the arms of said element being in part of less width than said plate, the latter adapted to be swung through an arc of substantially one hundred eighty degrees to cause a portion thereof to become disposed between the said arms of said element and a wind-shield pane, said arms adapted to coact with the said pane to retain said plate in the last-named position, said plate being flexible and adapted to be bent between its side edge portions to permit the latter to be brought inwardly of the arms of said element and the wider edge portions to be inserted between the said arms and said pane.

4. A device of the kind specified, including a plate of transparent or translucent material adapted to occupy a position back of a wind-shield substantially as set forth, a supporting member from which said plate is pivotally suspended, arms at the sides of said supports adapted to be secured at their other ends to a part of a vehicle contiguous to the upper edge of the wind-shield pane, the space between the arms of said element being in part of less width than said plate, the latter adapted to be swung through an arc of about one hundred eighty degrees from its suspended position to cause said edge portions thereof to become disposed opposite the portions of said arms adapted to oppose the wind-shield, said arms including flexible portions, adapted to be sprung out of normal position to permit the last-named positioning of said plate when the device is mounted in a vehicle as aforesaid.

CURTIS L. CRUVER.